United States Patent [19]

Johannsen

[11] 4,392,417
[45] Jul. 12, 1983

[54] VARIABLE DEAD BAND PRESSURE CONTROL SYSTEM

[75] Inventor: James R. Johannsen, Minnetonka, Minn.

[73] Assignee: McQuay-Perfex Inc., Minneapolis, Minn.

[21] Appl. No.: 179,016

[22] Filed: Aug. 18, 1980

Related U.S. Application Data

[62] Division of Ser. No. 34,869, Apr. 30, 1979, Pat. No. 4,257,318.

[51] Int. Cl.³ .............................................. B64D 13/00
[52] U.S. Cl. ......................................... 98/1.5; 236/14; 165/31; 62/186
[58] Field of Search ................... 236/13, 14, 49, 91 F; 98/33 R, 1.5; 165/31, 16; 62/186

[56] References Cited

U.S. PATENT DOCUMENTS

| | | |
|---|---|---|
| 2,112,520 | 3/1938 | Crawford . |
| 2,282,210 | 5/1942 | Plum . |
| 3,591,077 | 7/1971 | Alton . |
| 4,011,735 | 3/1977 | Martz et al. . |
| 4,044,947 | 8/1977 | Spethmann . |
| 4,089,462 | 5/1978 | Bradford .......................... 236/91 R |
| 4,108,375 | 8/1978 | Keeney ............................. 236/91 F |
| 4,189,093 | 2/1980 | Schnaibel et al. ................ 236/91 F |

OTHER PUBLICATIONS

Johnson Control Apparatus Bulletin and Installation Instruction PC-4000 Electronic Static Pressure Controller.
Johnson Control Apparatus Bulletin and Installation Instruction HQ-3000 High Signal Discriminator.
Johnson Control Installation Instruction LQ3000 Low Signal Discriminator.

Primary Examiner—Albert J. Makay
Assistant Examiner—Henry Bennett
Attorney, Agent, or Firm—Merchant, Gould, Smith, Edell, Welter & Schmidt

[57] ABSTRACT

A pressure control system for an air distribution system which includes a supply blower (10), a distribution duct network (20) and a plurality of air outlets (22a, 22b), includes a plurality of pressure sensors (25a, 25n) positioned at various points in the air ducts to measure pressure therein. Controls are provided for selecting the lowest of the sensed pressures (42) and the low pressure signal becomes one input to a variable dead band controller (44). Another input is an adjustment (45) for commanding the desired system pressure. The controller compares the pressure to a dead band threshold established about the set point and delivers appropriate signals to an actuator (31) which operates through a linkage (32) to control the inlet vortex vanes (33) and hence the air flow of the supply blower. A wide dead band is used to avoid hunting of the system, but when a response is required a narrow dead band is used to ensure that the system drives to the set point. Controls are provided (47) to periodically reset the controller to its narrow dead band position to prevent drift of the system. For systems also including a return blower (11) an additional controller (54) is provided to operate its actuator (35) to control its inlet vanes (37). Controls are provided (31b, 35b) for developing feedback signals indicative of air flow in the supply and return blowers, and these signals are applied to calibration circuits (52, 56) to the controller (54). The calibration circuits are specially designed to provide independent adjustment of maximum and minimum air flow tracking between the supply and return blowers.

3 Claims, 6 Drawing Figures

VARIABLE DEAD BAND PRESSURE CONTROL SYSTEM

This is a division of application Ser. No. 34,869, filed Apr. 30, 1979 now U.S. Pat. No. 4,257,318.

TECHNICAL FIELD OF THE INVENTION

The present invention pertains to a pressure control system for use in air distribution systems for buildings, for example ventiltion, heating, or cooling systems. In particular, the invention pertains to a system for maintaining the pressure within the distribution ducts, as sensed at a plurality of points near a plurality of discharge dampers or outlets, at or above a predetermined minimum pressure for proper air flow and operation of the damper devices, while avoiding excessive pressures which would represent a waste of energy.

BACKGROUND OF THE PRIOR ART

In many air distribution systems for buildings it is necessary or desirable to provide some type of control over the air moving apparatus so as to maintain a desired pressure, or pressures differential within the system. Systems of this type include, for example, ventilation, air conditioning or heating systems that include one or more fans or blowers and a network of air ducts for distributing air to a plurality of air vents or outlets throughout the building. One or more exhaust intakes are usually provided for returning air to the low pressure side of the blower, and often an intake is provided for introducing a certain amount of fresh or outside air into the system before recirculation through the ductwork to make up for air lost through building exhausts.

In such systems it may be necessary or desirable to monitor the air pressure within the ducts and to provide a control system to operate the fans or blowers to maintain a desired pressure difference between the air pressure in the ducts and the air pressure within the rooms of the building. This type of control may be necessary, for example, to maintain at least a minimum air circulation within the building according to the distribution system design. In other applications pressure control may be needed where the individual heater or ventilator outlets are controlled by damper boxes of the bellows type which are designed to depend upon at least a minimum air pressure differential for proper operation.

Without some type of pressure control, the air distribution system blowers would have to be designed to run continuously at a speed that would ensure proper operation under maximum load conditions with all or most outlets open. This would mean that for most of the time under normal building airflow demand, the blowers would be providing higher than optimum pressure, representing a waste of energy.

In larger systems it is common to use multiple blowers or fans, with a separate blower or blowers for the return air or exhaust from the building and one or more separate blowers to supply the air to the distribution duct system. The outlet of the return blower feeds to the inlet of the supply blower, and in addition a supplemental inlet is usually provided to add a certain amount of outside air to the inlet of the supply blower to make sure that the air circulating within the building stays fresh, and to make up for air escaping from the building through bathroom vents, exhaust hoods, and other air vent paths. Because of these air vent paths, the supply blower generally has to move a larger quantity of air than the return blower, with the difference being the amount of air discharged through the various exhaust vents.

As the various dampers or outlet controls in the air distribution system are modulated to control airflow, for example under local thermostatic control in the case of an air conditioning system, the air flow demand through the distribution ducts and hence the pressure therein will vary accordingly. The object of a pressure control system is to monitor these pressure variations, and to control the blowers so as to vary their output as required to maintain the desired pressure in the system despite variations in the air load requirements of the building. Too low pressure may interfere with proper ventilation or damper operation and too high pressure will simply waste energy.

As the air flow rate through the system is varied, it is necessary to vary the outputs of both the return and supply blowers. However, the vent loss air flow of the building tends to be relatively constant (excluding large industrial exhaust blowers on an intermittent cycle, discussed in greater detail below) and the required tracking or scheduling of outputs between the return and supply blowers is in general a nonlinear function through the range of air flow for the building. Accordingly, it is necessary for a pressure control system to provide proper adjustment and tracking between the two blowers.

Various pressure control systems for air distribution systems have been proposed in the prior art. One typical widely used system uses pressure transducers or sensors for sensing pressure at a number of points in the distribution duct system, for example adjacent to each damper control box and outlet. These transducer signals are fed to a control box which provides outputs for controlling motors which operate through linkages to control the intake vanes for the blowers so as to control the air volume rate thereof. The outputs from the control box to the actuators are basically proportional to the pressure signals developed by the transducer, with some limited adjustment capability for sensitivity, pressure set point, maximum air volume rate and dead band or pressure range of insensitivity. In systems having both return and supply blowers, the controller provides proportional outputs for both blowers, in some sort of scaled relationship to each other.

Although prior art systems as described above do achieve a useful degree of pressure control, the control they provide is far from optimum, and they are subject to problems in certain areas. One problem with prior art proportional control systems is constant "hunting" or low frequency oscillatory behavior of the system as the pressure varies back and forth across the set pressure. This hunting behavior causes unnecessary wear on the equipment due to the commanding of continual changes in air flow, and can lead to long-term fluctuations in duct pressure which affects the delivery of air in the building. Reducing the sensitivity or gain, or increasing the pressure dead band of the proportional control will reduce hunting, but will lead to slower response, lower accuracy, and greater short-term and long-term errors in the controlled pressure.

Another disadvantage of prior art systems is the imprecise tracking they provide for the supply and return blowers. Specifically, the adjustments or calibrations provided for the high air flow and low air flow settings are interdependent and interrelated, making it impossible or very difficult to calibrate or adjust the system for minimum tracking error at both maximum and minimum air flow delivery rates. Pressure mistracking of the exhaust and supply blowers can be a serious problem. In addition to preventing optimum energy savings, if the tracking error is great enough it could cause excessive positive or negative pressures within the building which could damage the ducts, or conceivably even cause breakage of windows if severe enough. Mistracking leading to a negative pressure within the building also presents the problem of unwanted infiltration of air through small leak paths in the building.

BRIEF SUMMARY OF THE INVENTION

To overcome these and other problems the present invention provides an improved pressure control system for an air distribution system. The present invention provides a variable dead band control for greater efficiency in maintaining the desired pressure while avoiding the problems of too high sensitivity and hunting. The system according to the present invention uses a plurality of pressure transducers mounted for sensing air pressure at a plurality of points in the air distribution system, and means for selecting and responding to the lowest of the sensed pressures. The lower pressure is compared to an operator adjustable desired set point by a variable dead band controller operatively connected to an actuator for controlling the supply blower air volume. Air volume is not altered unless the low pressure increases or decreases beyond a dead band on either side of the set point, in which case an appropriate response to increase or decrease air flow is made. At the same time that a response to increase or decrease air flow is made, the dead band is narrowed to force the system to rebalance more closely on the set point pressure, after which the dead band is returned to its wide setting to avoid excessive hunting.

According to another feature of the invention, means are provided for periodically resetting the dead band to its narrow setting, forcing the system to rebalance essentially at the set point in case the pressure has varied therefrom somewhere within the wide setting of the dead band. The dead band then returns to its wide setting. In this manner both short-term and long-term accuracy are provided without the problem of excessive hunting or oscillations.

According to another aspect of the invention, the return blower output is controlled in response to the air volume output operating condition of the supply blower at any given moment. Feedback means are provided for producing signals indicative of the air volume rates of the supply and return blowers at any given moment. In a preferred embodiment this is accomplished by feedback means for sensing the positions of the air flow control actuators for the blowers. These signals are compared in a controller which operates the return blower control actuator to track the supply blower. Special calibration circuits are included for the air volume sensing or actuator feedback sensing signals, so that the tracking provided by the control can be independently adjusted for maximum and minimum air flow rates for each blower, to enable extremely accurate tracking between the blowers. The controller for comparing the calibrated supply and return signals can also be a variable dead band controller to provide short and long-term accuracy in the tracking between the blowers while avoiding hunting or other oscillatory or drift behavior in the tracking.

DETAILED DESCRIPTION OF THE INVENTION

Figure 1:
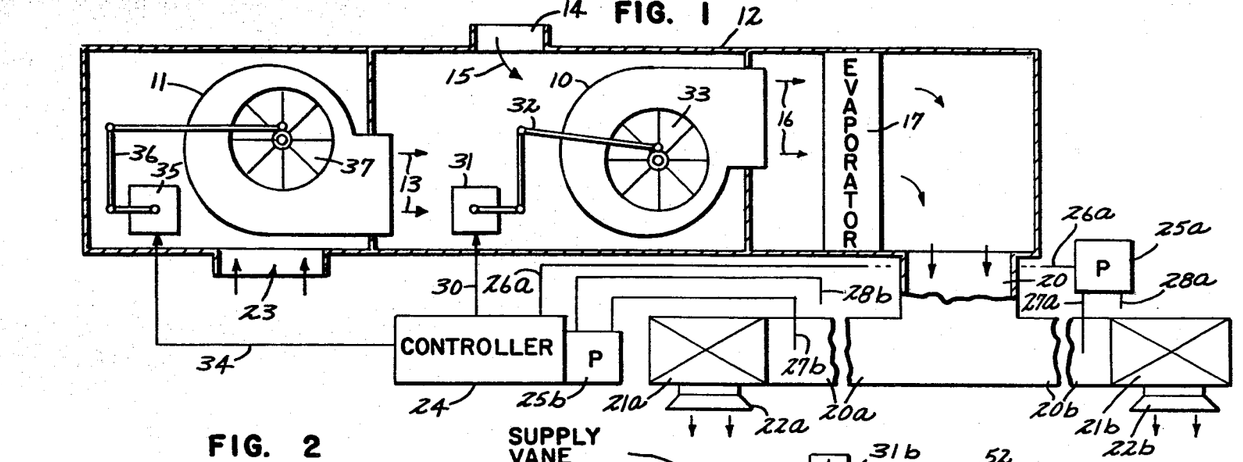
FIG. 1 is a diagrammatic view of an air distribution system to which the present invention may be applied for control of air pressure.

In FIG. 1, a typical multiple blower air distribution system is shown in simplified diagrammatic form. Reference number 10 indicates the supply blower and reference number 11 indicates the return blower. These blowers in the preferred embodiment are centrifugal or squirrel cage blowers, but other types of blowers or fans could also be used. Reference number 12 indicates the ductwork within which both blowers 10 and 11 are mounted. The output of blower 11, indicated by arrows 13, is fed to the intake of blower 10, along with an amount of fresh or make-up air through intake 14, as indicated by arrow 15. The outlet of blower 10, indicated by arrow 16, passes to distribution duct 20, directly in the case of an air ventilation system, or through an evaporator or cooling coil 17, in the case of an air conditioning system.

Duct 20 branches to a number of outlets throughout the building for distribution of the air, two of which are shown in FIG. 1. Duct branches 20a and 20b lead to damper control boxes indicated by reference numbers 21a and 21b, and to discharge openings or grills 22a and 22b. Damper control boxes 21a and 21b would be thermostatically operated, in the case of an air conditioning system, by separate thermostats in the zones or rooms of the building with which their air discharge is associated, but these temperature control loops are not part of the pressure control system of the present invention, and have therefore been omitted from FIG. 1. Likewise, the rest of the refrigeration system and the controls therefor for operating evaporator or cooling coil 17 are not part of the present invention and are omitted.

Return air from the room or other spaces in the building is collected by one or more return ducts and returned to return air openings 23 of duct 12. From there the air passes through the return blower to complete the path.

It will be appreciated that the total volume of air passing through duct 20 and all the various discharge outlets is greater than the total volume of air returning through opening 23. The difference is the amount of air exhausted from the building through vents associated with bathrooms and kitchens, vents associated with exhaust hoods for particular pieces of equipment, and other small losses due to opening of doors and the like since the building is preferably maintained at a small positive pressure. The difference in air flow volume through duct 20 and inlets 23 is made up by the make-up air through inlet 14. Proper tracking and scaling of the air flow volumes of supply blower 10 and return blower 11 throughout their operating ranges to accommodate these differences in air flow volumes is one of the important features of the invention.

For illustrative purposes, the control system of the present invention is indicated by reference number 24 in FIG. 1. It receives inputs from a plurality of pressure transducers positioned at various locations throughout the distribution system. For example, pressure transducer 25a is associated with duct 20b and damper control box 21b. Transducer 25a produces electrical signals on lead 26a responsive to the differential pressure at its location near damper control box 21b. For this reason, transducer 25a has a pressure tap 27a mounted within duct 20b, and a reference pressure tap or port 28a for sensing the room ambient pressure downstream from damper control box 21b. In this manner transducer 25a senses the pressure differential from input side of damper control box 21b to ambient. The electrical signals developed by transducer 25a are transmitted through electrical conductor or cable 26a to controller 24.

As an alternative to remote mounting of the pressure transducers at the duct locations, the transducers can be mounted adjacent the controllers, as for example transducer 25b, and the pressures to be sensed can be routed to the transducer via small tubing. Tube 27b carries the pressure in duct 20a just upstream from damper control box 21a to the transducer, and tube 26b carries the ambient pressure around and downstream of damper control box 21a to the transducer.

Controller 24 provides outputs, as will be explained below with reference to the other figures, for controlling the air volume rates of the blowers. Control lead 30 connects from controller 24 to an actuator 31. This actuator includes a geared electric motor which operates a linkage 32 which control the position of the vortex inlet vanes 33 for centrifugal blower 10. In a similar manner, control lead 34 connects to actuator 35 which controls the position of vortex inlet vanes 37 via linkage 36. Actuators 31 and 35 and their associated components are generally known in the art as a standard way of controlling the volumetric air flow through a centrifugal blower. Induction electric motors (not shown) are operatively connected to drive the blowers. By closing vanes 33 the intake is choked off and the output 16 of blower 10 is effectively stopped. By fully opening vanes 33, full output of air is achieved. On initial installation, the pulley size for the motor drive belts can be adjusted to give the desired blower speed for maximum air flow according to the specific design for a given building. Thereafter, during normal operation, actuator 31 can control the air delivery rate by the supply blower, and actuator 35 can likewise control the delivery rate for blower 11, under control of the control system of the present invention.

It will be appreciated that other types of controls, as are generally known in the art, could be provided as an alternative to the centrifugal blower and vortex inlet vanes discussed above. For example, a discharge damper could be used at the outlet of the supply blower. This is sometimes used for small systems, but it is not as efficient as the vane control. A variable speed motor for the blower could be used. Also, a fan having variable pitch blades could be used. In any case, appropriate actuators can be provided to interface with the control system to enable it to control air flow in the system.

Figure 2:
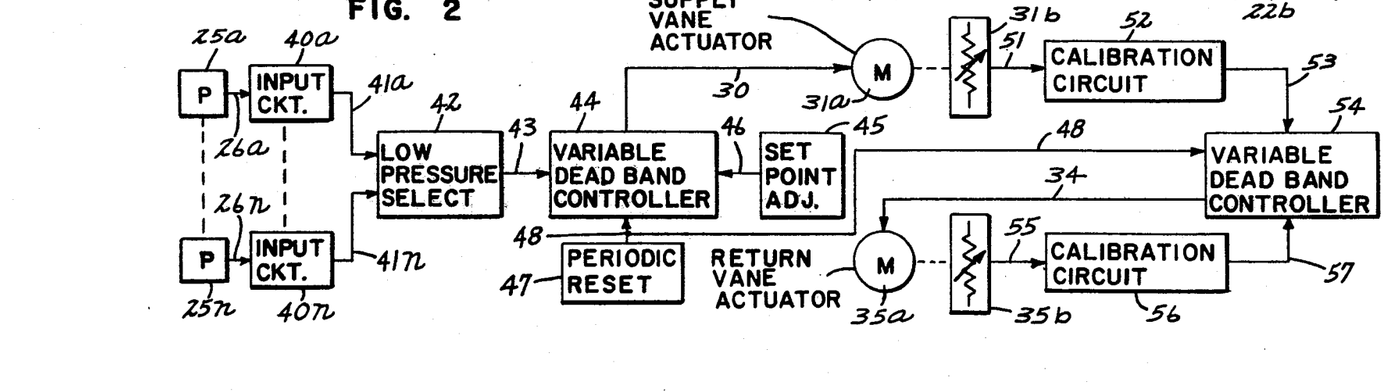
FIG. 2 is a block diagram of a control system according to the present invention.

Referring now to FIG. 2, the overall control system will be explained in block diagram form, after which the individual components of FIG. 2 will be explained in greater detail. Any number of pressure transducers can be provided, as required for a given system design. For simplicity, FIG. 2 shows only the first and last transducers and input circuits. Transducers 25a through 25n connect through leads 26a through 26n to corresponding input circuits 40a through 40n. The input circuits connect through leads 41a through 41n to a circuit 42 which selects the signal corresponding to the lowest pressure and transmits it via lead 43 to an input of variable dead band controller 44. Adjustable means 45 are provided for adjusting the pressure set point of the system, and the signal generated thereby is conveyed via lead 46 to controller 44. Reference number 47 applies to the periodic reset circuitry which connects to controller 44 through lead 48. The output of controller 44 connects via lead 30 to operate motor 31a of the supply vane control actuator 31.

The element of FIG. 2 described above would suffice for a system using only a supply blower or blowers without a separate return blower. For controlling the return blower in a system as shown in FIG. 1, additional control components are provided. Reference number 31b indicates a position sensing potentiometer mechanically coupled to motor 31a or linkge 32 to provide feedback information on the air volume setting for supply blower 10. Signals from feedback potentiometer 31b are conveyed through lead 51 to a calibration circuit 52, and from there via lead 53 to another variable dead band control circuit 54. Controller 54 receives its other input from the position feedback potentiometer 35b of actuator 35 for blower 11 through lead 55, calibration circuit 56 and lead 57. The output of controller 54 on lead 34 operates return vane actuator motor 35a.

Figure 3:
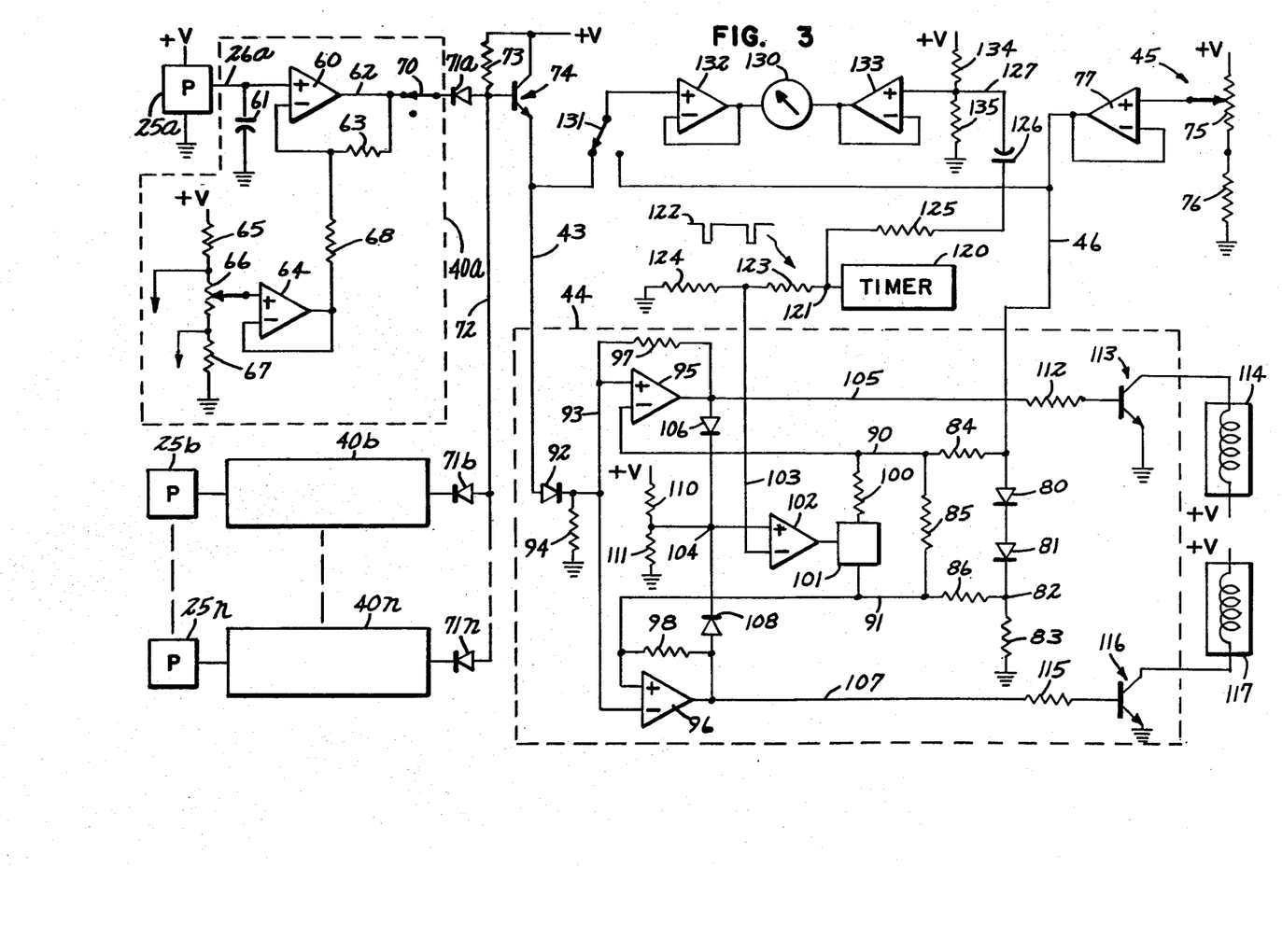
FIG. 3 is a schematic diagram of a portion of the system of FIG. 2.

Referring now to FIG. 3, a portion of the circuitry of FIG. 2 is shown in greater detail in electrical schematic form. Pressure transducer 25a receives power and ground connections for operating the circuits therein. The power supply source is not shown, since power supply circuits are well known in the art. Instead, the power supply source is indicated by the symbol +V. The pressure transducer can be any known type, for example a linear variable differential transformer-type transducer or a piezoresistive element. The electrical signal representing the sensed pressure appears on lead 26a, which connects to input circuit 40a. In similar manner, pressure transducers 25b through 25n corresponding to the number of channels that may be desired for a given application, connect to similar input circuits 40b through 40n, as suggested in the drawing. These input circuits may be identical, and for purposes of clarity, only input circuit 40a is shown in detail.

Input circuit 40a includes an operational amplifier 60 whose non-inverting input connects the lead 26a. A filtering or smoothing capacitor 61 may connect from this lead to signal ground. Operational amplifier 60, together with the other operational amplifiers shown in the figures, may be commonly available integrated circuit amplifiers. It will be understood that these amplifiers contain additional terminals for connection to power supplies, etc., but these have been omitted from the drawings for purposes of clarity. The output of amplifier 60 connects to lead 62, a branch of which feeds back through a feedback resistor 63 to the inverting input of the amplifier. The gain of amplifier 60 may be adjusted by selection of the values of resistors 63 and 68, to give the desired scale factor for the pressure measurement.

An offset voltage adjusting circuit consisting of amplifier 64 and associated components is also provided. A voltage divider consisting of resistor 65, potentiometer 66, and resistor 67 is connected in series beteen +V and signal ground. The variable tap of potentiometer 66 connects to the non-inverting input of operational amplifier 64, which is connected for unity gain. The output of amplifier 64 connects through resistor 68 to resistor 63 and the inverting input of amplifier 60. Potentiometer 66 may be adjusted to compensate for any zero pressure offset voltage associated with the pressure transducer 25a. Leads may be taken from the junction points of the voltage divider comprising elements 65–67, for use with offset trimming potentiometers for the other input circuits.

Output 62 of amplifier 60 connects through a switch 70 to the cathode of a diode 71a. Switch 70 is normally in the position indicated in FIG. 3, but may be switched off to disable its sensor channel. The other pressure sensing channels have similar switches. They can be used to disable some switches in the case of adapting a standard control system to a building requiring a smaller number of sensors, or they can be manually switched off, leaving one channel on, to individually check the transducers.

Switch 70, which is the output of circuit 40a connects through diode 71a to a summing point 72. The outputs of the other input circuits 40b, 40n similarly connect through diodes 71b, 71n to the summing point. For a circuit designed to use positive DC voltages to represent the sensed pressures, the diodes are connected as shown with their anodes tied to summing point 72. A bias resistor 73 connects from summing point 72 to +V, and summing point 72 also connects to the base of an NPN transistor 74 which is connected as an emitter follower amplifier with its collector tied to +V and its emitter connected to lead 43. Transistor 74 is used as a buffer, and any other type of buffer, such as an operational amplifier, could be used in its place. Summing point 72 automatically follows the voltage corresponding to the lowest pressure, i.e., the lowest output voltage of any of the input circuits 40, plus the forward bias voltage drop of the connecting diode. The voltage at lead 43 corresponds to the voltage for the lowest pressure channel at any given moment, since the small voltage drops for the connecting diodes and the base to emitter drop of transistor 74 essentially cancel except for minor differences which in practice can be disregarded. This means that as different pressures are experienced by the transducers at different moments, the voltage corresponding to whichever channel is experiencing the lowest pressure at a given moment will be followed at lead 43.

The voltage at lead 43 is applied as one input to variable dead band controller 44. The other main input is the voltage representing the set point pressure at lead 46. This voltage is generated by set point adjusting circuit 45, which includes a potentiometer 75 and a resistor 76 connected in series between +V and ground to form a voltage divider. The variable tap of potentiometer 75 connects through a unity gain buffer amplifier 77 to lead 46. By adjusting the position of potentiometer 75, the operator can select the pressure set point for the system. The controller will then maintain pressure at each monitored spot in the duct system to equal or exceed this set point pressure.

The voltage representing the set point pressure connects through two series connected forward biased diodes 80 and 81. The cathode of diode 81 connects through lead 82 and resistor 83 to signal ground. A resistor network consisting of resistors 84, 85, and 86 connects around diodes 80 and 81. Specifically, resistor 84 connects from lead 46 and the anode of diode 80 to lead 90. Resistor 85 connects from lead 90 to lead 91, and resistor 86 connects from lead 91 to lead 82.

Because of the forward biased condition of diodes 80 and 81, there will be an essentially constant voltage drop from lead 46 to lead 82, independent of the actual voltage level at lead 46. Therefore, even though the actual voltage at lead 46 will vary depending upon the adjustment of potentiometer 75, the voltage difference across the two diodes will be essentially constant. Neglecting for the moment the effect of resistor 100 and switch 101, the voltage difference between leads 90 and 91 will remain a constant value, equal to a predetermined proportion of the total voltage drop across diodes 80 and 81, as determined by the values of resistors 84, 85, and 86. This voltage difference between leads 90 and 91 is used to establish the dead band of the control. The voltage corresponding to the pressure set point of the controller is the mid-point of this dead band, or the voltage which would appear between diodes 80 and 81, or at the mid-point of resistor 85, assuming equal values for resistors 84 and 86.

Lead 43, which carries the lowest monitored pressure signal, connects through diode 92 to conductor 93. A load resistor 94 connects to signal ground. A branch of lead 93 connects to the non-inverting input of an operational amplifier 95, and another branch connects to the inverting input of an operational amplifier 96. Lead 90 connects to the inverting input of amplifier 95, and lead 91 connects to the non-inverting input of amplifier 96. A feedback resistor 97 connects from the output of amplifier 95 to its non-inverting input, and similarly, a feedback resistor 98 connects from the output to the non-inverting input of amplifier 96.

Resistor 100 and switch 101 are connected in series between leads 90 and 91. In the preferred embodiment, switch 101 is a CMOS electronic switch, but it will be appreciated that other types of mechanical or electronic switches could be used. Switch 101 is controlled from the output of an operational amplifier 102, which is used as a voltage comparator. The inverting input of amplifier 102 connects to lead 103, and the non-inverting input connects from lead 104.

The output of amplifier 95 connects to lead 105 and to the anode of a diode 106, whose cathode connects to lead 104. The output of amplifier 96 connects to lead 107, and to the anode of diode 108, whose cathode also connects to lead 104. Lead 104 also connects to the mid-point of a voltage divider which consists of the series connection of resistors 110 and 111 which connect between +V and signal ground. Lead 105 from amplifier 95 connects through a current limiting resistor 112 to the base of an NPN transistor 113, whose emitter connects to signal ground, and whose collector connects through the driving coil of a relay 114 to +V. In similar fashion, lead 107 from the output of amplifier 96 connects through a current limiting resistor 115 to the base of an NPN transistor 116 whose emitter connects to signal ground and whose collector connects through the driving coil of a relay 117 to +V. Relays 114 and 117 are the operating relays for driving the supply vane actuator 31a of FIG. 2. Specifically, energization of relay 114 drives motor 31a in a direction to close vanes 33 (FIG. 1). Energization of relay 117 energizes actuator motor 31a in a direction to open vanes 33. The design of controller 44 is such that relays 114 and 117 will not be energized simultaneously. However, if desired, an interlock for motor 31a can be provided by additional contacts for these relays as is generally known in the prior art. If desired, indicator lights for the control panel can be provided to indicate operation of the relays.

A timer, which can be for example a familiar type 555 integrated circuit is indicated by reference number 120. It provides an output at lead 121 which is normally high, but which periodically goes low as suggested by waveform 122. In the preferred embodiment, the interval between pulses is approximately one minute, and the duration of the negative portion of a pulse is approximately one-half second. In practice, timing resistors and capacitors are connected externally of timer 120 to adjust the timing parameters thereof, as is generally known in the art, and these external components have been omitted for purposes of clarity. Lead 121 connects through resistor 123 to lead 103, and from there through resistor 124 to signal ground. Lead 121 also connects through resistor 125 and capacitor 126 to lead 127.

A meter 130 is provided for giving a visual readout of either the lowest monitored pressure, or the commanded pressure, depending upon the position of switch 131. One terminal of switch 131 connects to a branch of lead 43, and the other terminal connects to a branch of lead 46. The pole of switch 131 connects to the non-inverting input of a unity gain buffer amplifier 132, whose output connects to one terminal of meter movement 130. The other terminal of meter movement 130 connects from the output of another unity gain buffer amplifier 133. The non-inverting input of amplifier 133 connects to lead 127. A bias resistor 134 connects from this input to +V, and a bias resistor 135 connects to signal ground.

With switch 131 in the position shown, the voltge corresponding to the lowest of the sensed pressures is applied to one side of the meter. The other side of the meter receives a reference voltage determined by the values of the voltage divider consisting of resistors 134 and 135. This voltage is selected as a nominal value approximately equal to the nominal zero pressure offset voltage of the pressure transducers as would be reflected at lead 43. The meter than can be used with potentiometer 66 to null out the offset. This null adjustment does not affect the gain through the input circuit. Meter 130 is calibrated in suitable units, such inches of water column.

With switch 131 in its other position, the set point reference voltage 46 is applied to meter 130 for display. This allows an operator to adjust potentiometer 75 while observing meter 130 to obtain the desired minimum set point pressure.

Figure 4:
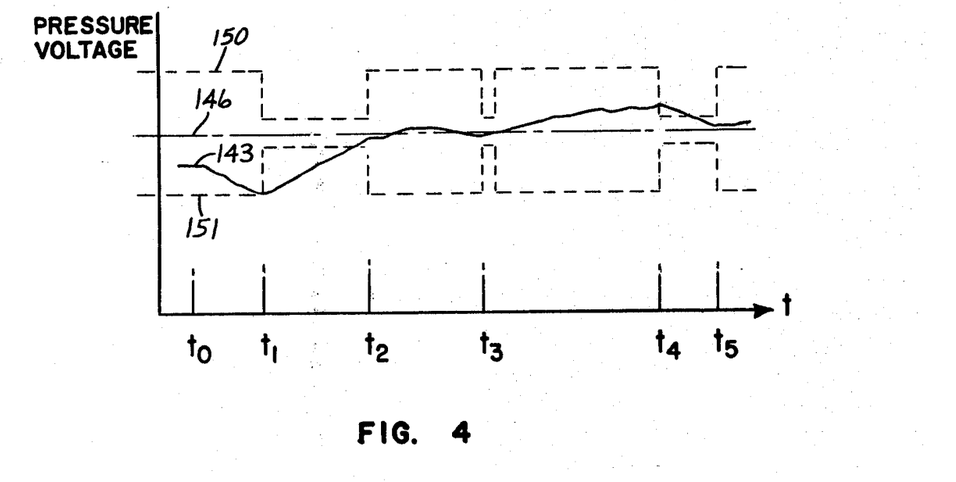
FIG. 4 is a chart of pertinent waveforms illustrating operation of the system of FIGS. 2 and 3.

The operation of the system, and in particular controller 44, in the control of supply blower 10 will now be explained with the help of FIG. 4. In FIG. 4, the vertical axis represents pressure or voltage, as the various pressures are electronically represented as voltages within the system. The horizontal axis represents time. Broken line 146 indicates the set point pressure, or voltage at lead 46 of FIG. 3. Curve 143 indicates the lowest of the monitored pressures, or voltage at lead 43. To be precise, the actual set point voltage used by circuit 44 is one diode drop below the voltage at lead 46, since it corresponds in effect to the mid-point between diodes 80 and 81. However, this drop is compensated for by diode 92 which introduces the same voltage drop for the pressure signal at lead 43. Accordingly, for purposes of clarity, these small voltage drops have been ignored in FIG. 4. Diode 92 also provides temperature compensation for changes in diodes 80 and 81.

Broken lines 150 and 151 represent the boundaries or thresholds of the dead band for controller 44. Broken line 150 corresponds to the voltage established on lead 90, and broken line 151 corresponds to the voltage established on lead 91. By adjusting the control potentiometer 75, the set point pressure and voltage as represented by broken line 146 can be moved upwardly or downwardly on the vertical axis. At the same time, broken lines 150 and 151 will move upwardly or downwardly with line 146 to maintain the same voltage amount of offset above, and below, respectively line 146. The difference in voltage between lines 150 and 151 will remain constant as lines 146, 150, and 151 move along the vertical axis. In the preferred embodiment, threshold lines 150 and 151 are symmetrically displaced from line 146, but this is not essential to the working of the invention, and different amounts of dead band could be provided in the positive and negative directions by selection of the values of resistors 84 and 86.

FIG. 4 shows a hypothetical sequence of operation events to illustrate the operation of the system. Assume that at time $t_0$, the lowest pressure channel which is selected and appears at lead 43 is at the voltage indicated by line 143. This voltage is below the command set point voltage 146, but it is within the boundaries established by dead band thresholds 150 and 151. With reference to FIG. 3, the voltate at lead 93 is neither high enough to trigger amplifier 95, nor low enough to trigger amplifier 96. Thus, both amplifier outputs remain low, driver transistors 113 and 116 remain off, and neither relay 114 nor 117 is energized. The condition would obtain for a pressure value of curve 143 anywhere between the boundaries established by dead band thresholds 150 and 151.

Assume that during the time interval from $t_0$ to $t_1$ that the pressure sensed at lead 43 starts to decrease. This could be caused, for example, by the opening of one or more vent outlets in the distribution system. This decrease in pressure is reflected in the downward slope of curve 143 in FIG. 4. At time $t_1$ curve 143 intersects the dead band threshold of broken line 151. In other words, the voltage at lead 93 has decreased to below the value of voltage at 91, causing amplifier 96 to change states to produce a high signal on lead 107. It will be appreciated that amplifiers 95 and 96 are essentially used as voltage comparators, and a certain amount of feedback resistance 97, 98, has been added to add hysteresis to the comparator circuits. When amplifier 96 changes states, lead 107 goes high turning on transistor 116 and energizing relay 117. With reference to FIGS. 1 and 2, this causes the supply vane actuator 31 to operate in a direction to open supply blower vanes 33 to increase the volume output of the blower. At the same time, the high level at lead 107 couples through diode 108 to cause comparator 102 to change states and turn on switch 101. The normal state for comparator 102 is a low output with switch 101 off and resistor 100 out of the circuit. This normal condition is achieved though the bias estbblished by resistros 110 and 111, and resistors 123 and 124, assuming the normal high output state of timer 120, as will be described in detail later.

However, when either amplifier 96 or amplifier 95 switches to its high state, the output is coupled through diode 108 or 106 to amplifier 102, causing it to switch on. This brings resistor 100 in series with resistor 85 and reduces the voltage difference existing between leads 90 and 91. This is reflected in FIG. 4 by the narrowing or the closing together of broken lines 150 and 151 following time $t_1$. This has the effect of narrowing the dead band. As the vane actuator motor is being driven to a more open position, the pressure in the system starts to increase, reflected by the upward slope of curve 143. Even though the pressure rises above the position of dotted line 151 prior to time $t_1$ amplifier 96 stays on and relay 117 continues to command an increase from the discharge, because of the narrowed threshold. Due to the hysteresis added by resistor 98, the actuator relay 117 will stay on until the pressure signal 143 increases above the narrow position of threshold 151, to a point very near the set point 146. This occurs at time $t_2$. In terms of the circuitry of FIG. 3, the voltage at lead 93 increases to above the voltge then existing at lead 91. This causes amplifier 96 to turn off, removing the drive to transistor 116 and actuator relay 117. At the same time, the high level to the input of comparator 102 is removed and it switches off again removing resistor 100 from the circuit. This restores the voltages at leads 90 and 91 to the wide position, and effectively widens the dead band threshold as indicated by broken lines 150 and 151 in the interval following time $t_2$.

The sequence of events between time $t_0$ and $t_2$ would be similar if the pressure had gone too high instead of too low. In that case, amplifier 95 would have been turned on to energize actuating relay 114 to cause the vanes of the supply blower to move toward the close position. At the same time the narrow threshold would have been established by diode 106 and comparator 102 in the manner previously described.

The purpose of timer 120 of FIG. 3 is to periodically strobe or reset the system to insure long-term accuracy. This is illustrated also in FIG. 4. From time $t_2$ to time $t_3$ assume that the lowest monitored pressure represented by curve 143 stays close to the command pressure 146. At time $t_3$ timer 120 produces its negative going output pulse. As previously mentioned, the timer in the preferred embodiment is set to produce pulses at one minute intervals. This pulse is coupled to the inverted input of amplifier 102, causing it to switch on to narrow the dead band threshold, as indicated by the position of broken lines 150 and 151 immediately following time $t_3$. However, at time $t_3$, this action has no effect since the monitor pressure is within the narrow dead band. Approximately one-half second later, timer 120 returns to its high level for another minute, and the dead band threshold returns to its wide position.

Assume now that the pressure monitored at lead 43 begins to drift, for example due to varying air requirements in the distribution system. In FIG. 4, curve 143 drifts upward following time $t_3$. At time $t_4$, one minute after time $t_3$, timer 120 again transmits a strobe or reset pulse causing comparator 102 to switch resistor 100 into the circuit to narrow the dead band. At this time comparator 95 wll turn on since the voltage at lead 93 is above the lowered voltage on lead 90 during the narrow dead band state. This causes actuator relay 114 to pull in to start to close the vanes for the supply blower. At the same time, the high level at lead 105 couples through diode 106 to comparator 102 to latch it in the narrow band position, even though the pulse from timer 120 is removed. The system stays in the state thus described until the closing of the blower vanes redues the pressure to below the narrow threshold value, and to near the set point pressure due to the hysteresis of amplifier 95. Amplifiers 95 and 102 then switch to their low output states, removing the drive to the actuator and restoring the wide dead band threshold setting. Of course, if a strobe or reset pulse from timer 120 should occur while the system is already commanding a change in the actuator position due to an out of tolerance monitored pressure, it will have no effect since amplifier 102 will already be commanding the narrow threshold setting.

Strobe or reset pulses generated by timer 120 are coupled to meter 130 through resistor 125 and capacitor 126. This provides a periodic twitch to the meter needle, as an indication of operation of the reset feature.

It will be apparent from the foregoing description that the system provides a variable dead band control that achieves both long-term and short-term accuracy and stability. By use of the wide dead band, constant chattering or hunting of the system is minimized. By switching to the narrow dead band setting when a repositioning of the blower supply vanes is required, the system ensures that the monitored pressure will be returned, not just barely inside the dead band threshold boundary, but inside the narrowed threshold boundary to very near the commanded pressure value. By periodically strobing and resetting the system, long-term drift which might otherwise cause the monitored pressure to move toward the boundaries of the wide dead band is held in check and the system is reset to near the commanded pressure.

The system thus far described provides accurate control of the supply blower to meet the minimum pressure requirements of the air distribution system. In systems using an additonal blower or blowers for the return air function, it is necessary to provide proper tracking of the air flow settings of the supply and return fans throughout their air flow range, as discussed above.

Figure 5:
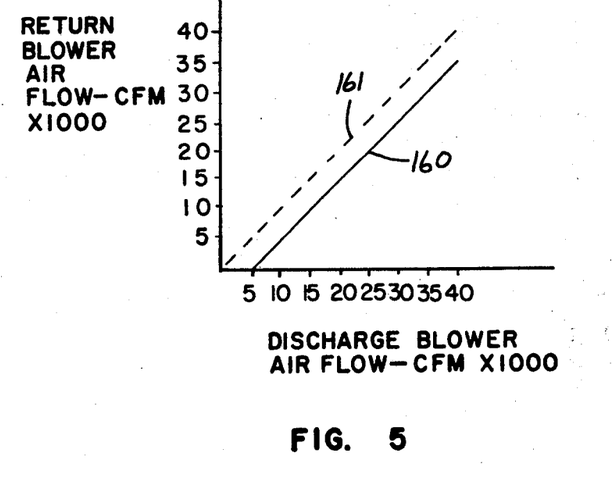
FIG. 5 is a graph showing an example of tracking between supply and return blowers.

FIG. 5 is a graph illustrating the required relationship between the air flow of the discharge blower and the return blower in a typical distribution system for a building. The horizontal axis represents the air flow in cubic feet per minute (CFM) times one thousand through the supply blowe, and the vertical axis represents the air flow through the return blower. Curve 160 represents the required relationship between the two blowers for the hypothetical building under discussion. Broken line 161 has been added for reference purposes, to represent equal values of the supply and return blowers. Curve 160 is offset below curve 161 by a constant value of 5,000 CFM, so that at a supply blower rate of 40,000 CFM, the return blower requirement is 35,000 CFM and so on down to a zero return blower requirement for a 5,000 CFM supply air flow. The 5,000 CFM difference represents the relatively constant exhaust from the building through bathroom vents and the like previously discussed. In actual practice, the return blower is operated at slightly less than the values indicated in FIG. 5 so that a slight positive pressure will be maintained in the building to prevent infiltration and to establish exfiltration therethrough.

For the typical building being considered, 40,000 CFM might represent the maximum design air flow that the system will ever be called upon to deliver, and 5,000 CFM might be the minimum value.

Figure 6:
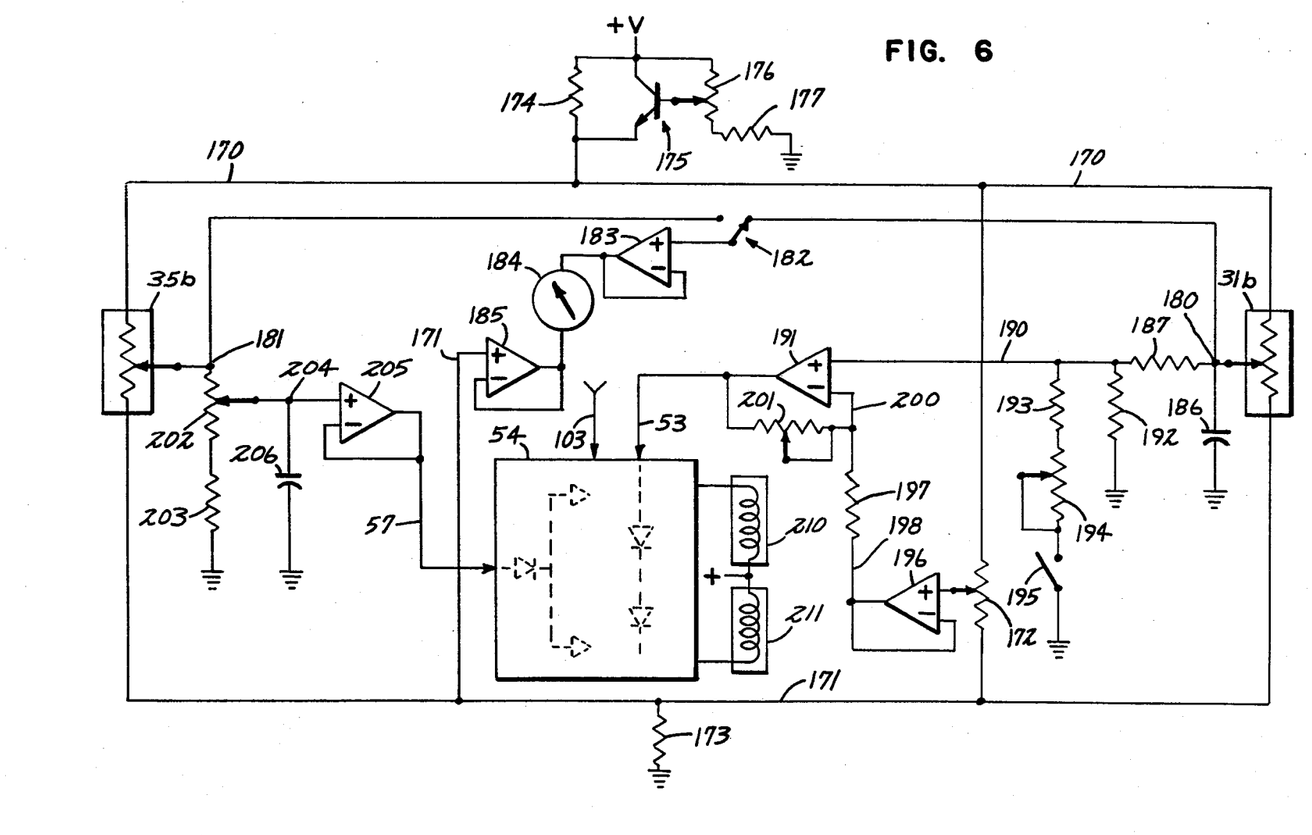
FIG. 6 is a schematic diagram of another portion of the system of FIG. 2.

In the present invention, the intake vanes 37 for the return blower 11 are positioned so that the return blower will properly track the supply blower according to the requirements of FIG. 5, by the control circuitry shown in FIG. 6.

In FIG. 6, the position feedback potentiometers 31b and 35b for the supply and return actuators respectively are connected in parallel between leads 170 and 171. A potentiometer 172 is also connected between leads 170 and 171. Lead 171 connects through resistor 173 to signal ground. Lead 170 connects from the +V power supply through a resistor 174. In addition, a NPN transistor 175 connects between +V and lead 170, with the emitter of the transistor connected to lead 170. A potentiometer 176 and a resistor 177 connected in series between +V and signal ground provide a voltage divider, with the variable tap of potentiometer 176 connected to the base of transistor 175.

In operation, the power and ground connections through the network establish a current flow through feedback potentiometers 35b and 31b. For calibration purposes when the circuit is installed in a given building with a given set of feedback potentiometers, potentiometer 176 can be adjusted to adjust the amount of current transistor 175 supplies to the network, so that the voltage drop between leads 170 and 171 can be set to a predetermined calibration value. Thereafter the adjustment of potentiometer 176 is not ordinarily needed.

The voltage at conductor 180, which connects to the variable tap of potentiometer 31b, indicates the position of the supply vane actuator, and hence the output of supply blower 10. At higho air flow settings, with the vanes relatively open, the voltage at lead 180 moves closer to the voltage at lead 170; and at low air flow settings, with the vanes somewhat closed, the voltage at lead 180 moves closer to the voltage at lead 171. In like fashion, the voltge at lead 181 which connects to the variable tap of feedback potentiometer 35b approaches the voltage at lead 170 at high air flow settings, and the voltage at lead 171 at low air flow settings.

A branch of lead 180 connects to one terminal of the switch 182. The other terminal of the switch connects to a branch of lead 181. The pole of switch 182 connects to the non-inverting input of a unity gain amplifier 183. The output of amplifier 183 connects to one terminal of a meter 184. A branch of lead 171 connects through unity gain amplifier 185 to the other terminal of meter 184. By selecting the position of switch 182, meter 184 will read the voltge corresponding to the position of the actuator for the supply blower or the return blower. Meter 184 can be calibrated on its face in suitable terms, such as percentage of opening of the vortex vanes.

A capacitor 186 connects between lead 180 and signal ground. A resistor 187 connects between lead 180 and lead 190, which leads to the non-inverting input of an operational amplifier 191. A resistor 192 connects from lead 190 to signal ground. An additional resistor 193 and a series connected variable resistance 194 connect to a terminal of a normally opened switch 195, whose other terminal contacts to signal ground. Switch 195 is connected to be actuated by a remote exhaust device for the building as explained below.

The variable tap of potentiometer 172 connects to the non-inverting input of unity gain amplifier 196. Its output connects to lead 198. Resistor 197 connects between lead 200 and lead 198. A branch of lead 200 connects to the inverting input of amplifier 191. The output of amplifier 191 connects to lead 53, and a variable feedback resistance 201, which may consist of a potentiometer with its variable tap tied to one end, connects from lead 53 to lead 200.

Lead 181 from the variable tap of potentiometer 35b connects to a potentiometer 202, the other side of which connects through a resistor 203 to signal ground. The variable tap of potentiometer 202 connects via lead 204 to the non-inverting input of a unity gain amplifier 205. A filtering capacitor 206 connects from lead 204 to signal ground. The output of amplifier 205 connects to lead 57.

Circuit 54 is a variable dead band controller substantially identical to circuit 44 of FIG. 3. Lead 53 connects to the input of circuit 54 which corresponds to the connection of lead 46 to circuit 44. This input establishes the set point and connects to the forward biased diodes which establish the dead band thresholds. Lead 57 connects to the input of circuit 54 corresponding to the connection of lead 43 to circuit 44. This input lead to the high and low threshold comparators. Relay coils 210 and 211 are connected to the outputs of circuit 54, and these relays connect to control the actuator 35 for the return blower. Actuation of relay driver 210 causes closing of the return vanes, while actuation of relay driver 211 causes opening thereof. Lead 103, which branches from lead 103 of FIG. 3, connects to circuit 54 to trigger periodic narrowing of the dead band according to the timing signals provided by timer 120 of FIG. 3.

In the preferred embodiment the only difference between circuit 54 and circuit 44 is the selection of component values which determine the width of the dead band. It has been determined experimentally that best operation requires a somewhat narrower dead band for circuit 44 than for circuit 54.

In operation, the signal at lead 53, which is derived from the supply vane actuator position potentiometer, establishes a set point to which the signal on lead 57, which is derived from the return vane actuator position potentiometer, is compared. If correction is required, one or the other of relay 210 or 211 is energized to reposition the return blower vanes.

The correct tracking according to the requirement of FIG. 5 is achieved through the calibration circuits 52 and 56 of FIG. 2, which connect between the actuator position potentiometers and the controller 54. Generally speaking, a single calibration control is not feasible, because of differences in the characteristics of the supply and return blowers, such as design, size, speed of operation, etc. For these reasons, a single calibration control cannot be assumed to simply translate broken line 161 of FIG. 5 to the desired position 160 of FIG. 5. Instead, separate calibration controls are provided to obtain the desired return air flow at both the maximum and minimum supply air flow positions. With these points properly adjusted, sufficient accuracy of tracking at intermediate air flow settings is usually achieved. Preferably linkages 32 and 36 are designed in conjunction with the characteristics of their respective blowers to give approximately linear or proportional air flow in relationship to actuator shaft position. However, the control system of the present invention can be adjusted to compensate even if a high degree of linearity is not provided.

Calibration circuit 52 of FIG. 2 comprises amplifiers 191, 196 of FIG. 6 and associated components including voltage divider 187, 192. Calibration circuit 56 of FIG. 2 comprises potentiometer 202 of FIG. 6 and associated components. In the preferred embodiment, calibration is achieved by first setting potentiometer 201 to completely bypass itself and provide zero resistance in the feedback path for amplifier 191. With this setting, amplifier 191 becomes a voltage follower, independent of the output of amplifier 196, and the voltage at lead 53 will substantially equal the voltage at least 190. The air system in the building is then set to provide the maximum expected supply air flow. This can be achieved through a suitable manual control, or by adjustment of the individual room thermostats to open a predetermined number of vents.

Potentiometer 202 is then adjusted to cause controller 54 to command the return blower to deliver the correct amount of air to properly balance the building pressure. This establishes one reference point of the tracking calibration.

From an examination of FIG. 6, it will be apparent that the gain of amplifier 191 could be adjusted to control the rate at which the voltage at lead 53 decreases in response to a decrease in the voltage at lead 190, and this gain adjustment could be used to establish the minimum air flow tracking point. However, to do so would upset the previously adjusted maximum air flow tracking point. This type of unwanted interdependence of the maximum and minimum air flow tracking points is experienced by prior art systems, and leads to inaccurate settings or trackings, unless the maximum and minimum adjustments are balanced back and forth very carefully through a repetitive process until the best compromise is reached. In practice, field personnel do not always follow the required repetitive balancing of maximum and minimum controls, resulting in mistracking of the supply and return blowers.

To avoid these problems due to interdependence of the calibration controls, the present invention provides an additional independence adjustment including potentiometer 172 and associated components. Amplifier 196 is connected as a voltage follower to the variable tap of potentiometer 172, and the voltage it produces at its output is applied to resistor 197 which connects to the inverting input of amplifier 191 at lead 200. An examination of the circuitry associated with amplifiers 191 and 196 shows that, in general, the output voltage at lead 53 would be dependent upon the input voltage at lead 190, the setting of potentiometer 172, the gain adjustment of potentiometer 201 and the value of resistor 197. However, the output voltage at lead 53 can be made independent of the setting of potentiometer 201 at a given reference point, by adjusting potentiometer 172 to provide a voltage at lead 198 that is equal to the voltage at lead 190 at the given reference point. This given reference point is the maximum air flow setting of the supply blower, so that subsequent adjustment for the minimum air flow tracking point will not upset the adjustment for the maximum air flow tracking point.

With the air flow in the building still set for the maximum amount, and with potentiometer 202 adjusted for tracking at this point as previously described, potentiometer 172 is adjusted so that the voltage at lead 198 equals the voltage at lead 190. This can be done through the use of a suitable voltmeter, or it can be done with the aid of vane position meter 184. With switch 182 set to read the return actuator position, which connects lead 181 to amplifier 183. The reading of meter 184 is noted at this point. Resistor 201 is then adjusted to provide full feedback resistance for amplifier 191, which increases its gain to the maximum, which in the preferred embodiment is a factor of two. This causes the voltage at lead 53 to decrease, even though the voltage at lead 190 has not changed. This in turn causes controller 54 to command a repositioning of the return actuator, and meter 184 starts to move. Potentiometer 172 is then adjusted to bring the return vane position as read on meter 184 back to where it was prior to the adjustment of resistor 201. At this point the voltage at lead 198 equals the voltage at lead 190.

The next calibration step is to set the supply blower to the minimum air flow setting, either by suitable manual controls or by adjustment of the individual thermostats in a predetermined number of the individual rooms. This causes the voltage at lead 190 to decrease substantially, and the voltage at lead 53 to decrease even more, due to the gain of amplifier 191. As the supply blower repositions to a low setting, the return blower will be commanded to an even lower proportionate setting, due to the gain of amplifier 191. Potentiometer 201 may then be backed off to reduce the gain of amplifier 191, increasing the voltage at lead 53, and causing controller 54 to command an increase in the setting for the return vane actuator. Potentiometer 201 is turned until the return air flow reaches the required amount corresponding to the minimum air flow setting. The minimum air flow tracking point has then been established. However, this readjustment of potentiometer 201 has not upset the previously established maximum air flow tracking point, due to the action of potentiometer 172 and amplifier 196 in providing the voltage corresponding to the high air flow reference point as described above.

Switch 195 is connected for remote actuation by a large intermittent exhaust fan in the building, for example an exhaust hood over a welding operation, or the like. When the exhaust hood is operating, a tracking relationship between the supply and return blowers needs to be readjusted to compensate for the additional exhaust from the building. Specifically, the air flow of the return blower needs to be reduced. This is accomplished by closing switch 195 which alters the voltage divider and reduces the voltage at lead 190. This in turn reduces the voltage at lead 53 and commends a lower air flow setting for the return blower. Potentiometer 194 can be adjusted to the appropriate setting corresponding to the particular exhaust fan. If more than one intermittent exhaust fan is used, additional compensating networks can be used, and if there are no intermittent exhaust loads elements 193-195 would not be used.

From the above description it will be apparent that the present invention provides a highly accurate and efficient pressure control system for an air distribution system which maintains the minimum pressure for optimum operation and avoids the energy waste of excessive pressure. Through the use of the variable dead band control, and periodic reset, excellent system response and long and short term accuracy are maintained, while unwanted system effects such as drift and hunting are avoided. The invention also provides an improved control for a return blower with independent calibration capability for the maximum and minimum air flow conditions to provide accurate tracking between supply and return blowers.

What is claimed is:

1. A control system for controlling the return air blower of an air distribution system including a supply blower which may operate at varying air flow rates, for maintaining proper relative airflow of the return blower in response to the airflow of the supply blower, comprising:

means responsive to the supply air flow for producing a signal indicative thereof;

means responsive to the return air flow for producing a signal indicative thereof;

actuator means operatively connected for controlling the air flow of said return blower;

comparison means operatively connected to provide control signals to said actuator in response to received supply and return air flow signals, to control return air flow to follow supply air flow;

calibration means connecting said supply air flow signal and said return air flow signal to said comparison means, said calibration means including adjustable means for independent adjustment of high and low air flow rate settings of said actuator corresponding to high and low air flow settings of said supply blower; and said comparison means including a variable dead band controller for providing said control signals to said actuator when the calibrated supply and return air flow signals applied thereto differ by more than a predetermined dead band, and including means for narrowing the dead band to rebalance the system according to the supply air flow and for widening the dead band to prevent excessive system hunting or oscillation.

2. A pressure control system for controlling the return air blower of an air distribution system which also includes a supply blower which may operate at varying air flow rates, for maintaining proper relative air flow of the return blower in response to the air flow of the supply blower, comprising:

means for providing supply feedback signals indicative of the supply air flow;

means for providing return feedback signals indicative of return air flow;

an actuator operatively connected for controlling the air flow of said return blower;

comparison circuit means connected to provide control signals to said actuator in response to received supply and return air flow signals, said comparison means operative to control said actuator in a sense to drive the return air flow to follow supply air flow;

a return calibration circuit connecting said return feedback signals to said comparison means and including adjustable means for scaling the signal applied to the comparison circuit in proportion to the return feedback signal; and a supply calibration circuit including an operational amplifier having an adjustable resistance in its feedback loop and having a non-inverting input connected to receive said supply feedback signal and an output connected to convey scaled supply signals to said comparison means, a voltage reference source connected to the inverting input of said variable gain amplifier, and means for adjusting said voltage reference source to substantially equal said supply feedback signal at a reference supply air flow whereby the output of said variable gain amplifier and said comparison means is independent of the feedback resistance setting of said amplifier at said reference air flow to permit independent adjustment of maximum and minimum air flow settings for the tracking of the supply blower by the return blower.

3. A control system according to claim 2 wherein said comparison means includes a variable dead band controller for providing said control signals to said actuator when the calibrated supply and return air flow signals applied thereto differ by more than a predetermined dead band, and including means for narrowing the dead band to rebalance the system according to the supply air flow and for widening the dead band to prevent excessive system hunting or oscillation.

* * * * *